United States Patent
Yano et al.

[11] Patent Number: 6,033,572
[45] Date of Patent: Mar. 7, 2000

[54] METHOD AND APPARATUS FOR TREATING SELENIUM-CONTAINING WASTE WATER

[75] Inventors: Rie Yano; Hideo Nishizawa, both of Saitama, Japan

[73] Assignee: Organo Corporation, Tokyo, Japan

[21] Appl. No.: 09/142,906

[22] PCT Filed: Mar. 18, 1997

[86] PCT No.: PCT/JP97/00876

§ 371 Date: Jan. 15, 1999

§ 102(e) Date: Jan. 15, 1999

[87] PCT Pub. No.: WO97/34837

PCT Pub. Date: Sep. 25, 1997

[30] Foreign Application Priority Data

Mar. 19, 1996 [JP] Japan .................................. 8-090045
May 24, 1996 [JP] Japan .................................. 8-153027

[51] Int. Cl.$^7$ .................................. C02F 3/28; C02F 1/62
[52] U.S. Cl. .................................. 210/631; 210/202; 210/912
[58] Field of Search ........................ 210/605, 610, 210/611, 612, 630, 631, 912, 202, 209

[56] References Cited

U.S. PATENT DOCUMENTS

| | | | |
|---|---|---|---|
| 4,519,913 | 5/1985 | Baldwin et al. | 210/611 |
| 4,663,047 | 5/1987 | Krauthausen et al. | 210/631 |
| 4,725,357 | 2/1988 | Downing et al. | 210/611 |
| 4,910,010 | 3/1990 | Khalafalla | 210/611 |
| 5,009,786 | 4/1991 | Oremland | 210/610 |

FOREIGN PATENT DOCUMENTS

| | | |
|---|---|---|
| 0 773 192 | 5/1997 | European Pat. Off. . |
| 48-30558 | 9/1973 | Japan . |
| 5-78105 | 3/1993 | Japan . |
| 8-267076 | 10/1996 | Japan . |
| 8-299986 | 11/1996 | Japan . |

OTHER PUBLICATIONS

Patent Abstracts of Japan, vol. 097, No. 009, Sep. 30, 1997 & JP 09 136099 A (Kurita Water Ind. Ltd), May 27, 1997.
Gerhardt et al "Removal of Selenium using a Novel Algal–Bacterial Process"., Research Journal of the Water Pollution Control Federation—vol. 63, No. 5, Jul. 1, 1991; pp. 799–805.
Smith et al: "Elimination of Toxic Metals From Wastewater by an Integrated Wastewater by an Integrated Wastewater Treatment/Water Reclamation System", Water SA, vol. 7, No. 2, Apr. 1981, pp. 65–70.

*Primary Examiner*—Thomas G. Wyse
*Attorney, Agent, or Firm*—Sughrue, Mion, Zinn, Macpeak & Seas, PLLC

[57] ABSTRACT

Selenium-containing wastewater is sequentially treated through use of biological treatment means (6), chemical treatment means (12), and filtration means (14). In the biological treatment means (6), raw waste water (16) is subjected to anaerobic biological treatment so as to reduce selenate ions and/or selenite ions (soluble selenium) present in the raw waste water (16) to simple selenium, which is insoluble, to thereby remove the selenate ions and/or the selenite ions in the form of insoluble simple selenium. In the chemical treatment means (12), for example, a metal salt that reacts with soluble selenium to form an insoluble selenium compound is added to water treated by the biological treatment means (6), to thereby remove residual soluble selenium in the form of the insoluble selenium compound. In the filtration means (14), an insoluble substance remaining in water treated by the chemical treatment means (12) is removed through filtration. Thus, soluble selenium can be removed from the selenium-containing wastewater to a great extent without using a large amount of chemicals and without generating a large amount of sludge. Accordingly, a wastewater regulation limit of not greater than 0.1 mg Se/L can be cleared, and running cost and waste treatment cost can be reduced.

9 Claims, 1 Drawing Sheet

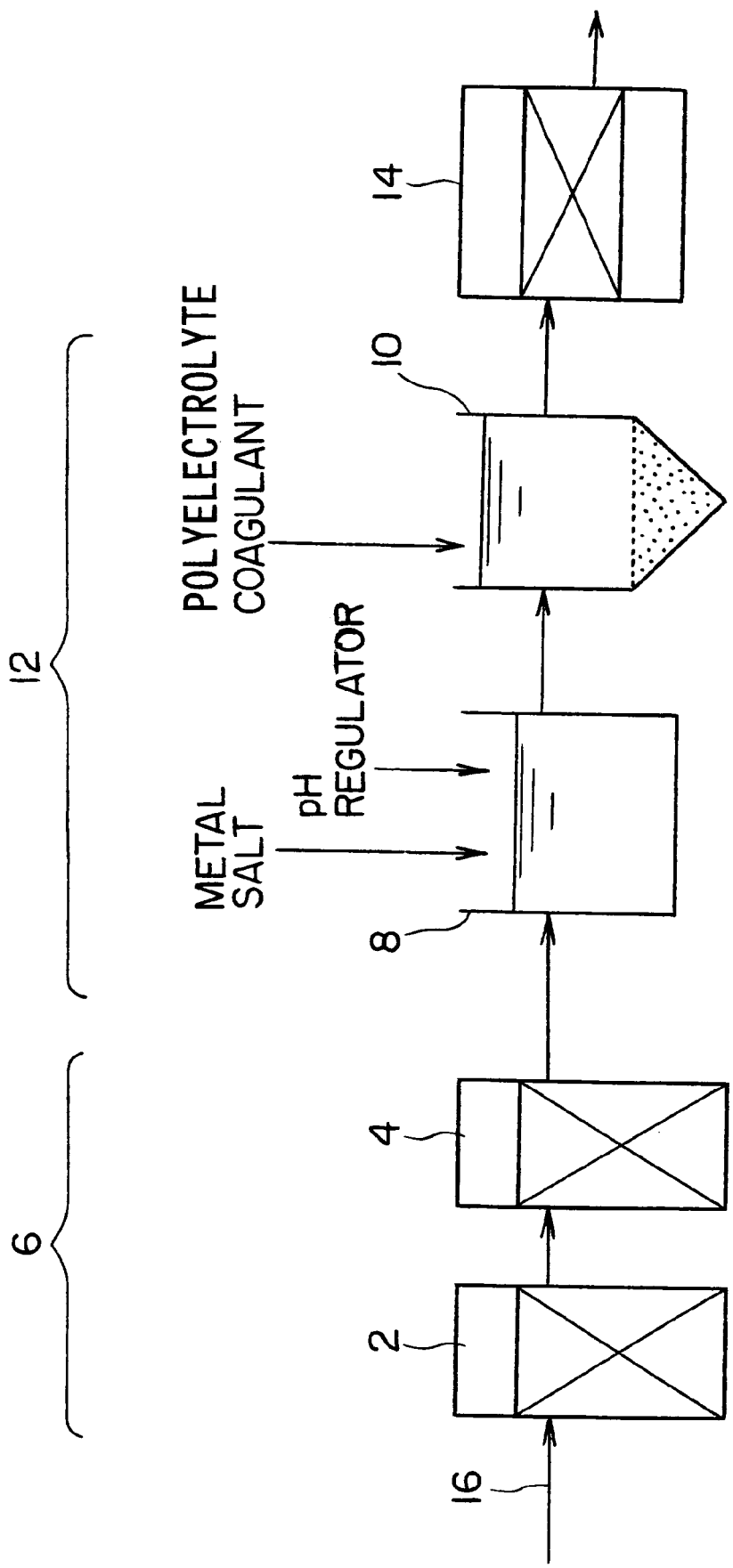

METHOD AND APPARATUS FOR TREATING SELENIUM-CONTAINING WASTE WATER

TECHNICAL FIELD

The present invention relates to a method and an apparatus for treating selenium-containing wastewater such as metal refinery wastewater, mine wastewater, thermal power plant wastewater, glass plant wastewater, etc.

BACKGROUND ART

In selenium-containing wastewater mentioned above, selenium is normally dissolved in wastewater in the form of selenate ions ($SeO_4^{2-}$: hexavalent selenium) and/or selenite ions ($SeO_3^{2-}$: tetravalent selenium). In some cases, only one of these kinds of ions may be present in wastewater, but in many cases the two types coexist. Technology for removing selenium from selenium-containing wastewater has not been sufficiently studied, since removal of selenium in particular had not been required before the Water Pollution Control Law was revised in 1993 to add selenium to regulated items. According to the revision, the selenium concentration of wastewater must be lower than 0.1 mg Se/L.

Under the circumstances, there have been studied the following methods (1)–(3) for removing selenate ions and selenite ions (hereinafter, may be collectively referred to as soluble selenium) from selenium-containing wastewater.

(1) Metal salts such as a magnesium salt, a zinc salt, a ferric salt, etc. are added to selenium-containing wastewater to remove selenium in the form of insoluble compounds of selenium with these metal salts.

(2) A ferrous salt, which can reduce soluble selenium to simple selenium (Se), is added to selenium-containing wastewater so as to make soluble selenium insoluble. Subsequently, the thus-generated insoluble substances are removed through sedimentation or the like. In this method, soluble selenium is reduced to simple selenium, which is insoluble, through reducing action of $Fe^{2+}$; $Fe^{2+}$ reacts with soluble selenium to form insoluble selenium compounds; and generated hydroxide flocs cause simple selenium or soluble selenium to undergo various inter reactions such as coprecipitation, separation, and the like. Thus, soluble selenium is made into insoluble substances, which are then removed.

(3) Soluble selenium contained in selenium-containing wastewater is reduced to simple selenium through anaerobic biological treatment. Thus-formed simple selenium is separated and removed.

However, the above methods (1)–(3) had the following shortcomings. In the chemical treatment method (1), in which metal salts such as a magnesium salt, a zinc salt, a ferric salt, etc. are added to form insoluble selenium compounds, insoluble selenium compounds are formed relatively easily from tetravalent selenite ions, whereas insoluble selenium compounds are less likely to be formed from hexavalent selenate ions. Accordingly, hexavalent selenate ions remain within treated water. Thus, removing selenate ions was difficult.

In the chemical treatment method (2), in which a ferrous salt is added to make soluble selenium into insoluble substances, both selenate ions and selenite ions can be removed. However, this method requires a considerably large amount of a ferrous salt, and a large amount of an insoluble substance (sludge) is generated, thus involving a disadvantage in terms of running cost and waste (sludge) treatment cost.

In the biological treatment method (3), in which soluble selenium is reduced to simple selenium through anaerobic biological treatment, both selenate ions and selenite ions can be removed through reduction to simple selenium. However, it is difficult to remove selenium to a trace level. Thus, it was often difficult to clear the new wastewater criterion that limits selenium concentration to lower than 0.1 mg Se/L. For wastewater having a low selenium concentration, the selenium concentration may be reduced to below the allowable limit through anaerobic biological treatment alone. However, according to a study conducted by the inventors of the present invention, in the case of wastewater which contains a relatively high concentration of selenium, or wastewater whose selenium concentration varies, biological treatment became unstable due to load variations and like causes, and thus it was difficult to perform stable treatment by which the selenium concentration was always being held below the allowable limit.

The present invention has been achieved in view of the foregoing circumstances, and an object of the present invention is to provide a cost-effective method for treating selenium-containing wastewater capable of removing hexavalent selenate ions and/or tetravalent selenite ions from selenium-containing wastewater so as to satisfy a wastewater regulation limit of lower than 0.1 mg Se/L, without using a large amount of chemicals such as metal salts and the like and without generating a large amount of sludge, and to provide an apparatus for carrying out the method.

DISCLOSURE OF THE INVENTION

To achieve the above object, the inventors of the present invention conducted extensive studies and found that the object was effectively achieved by a method comprising the steps of: subjecting selenium-containing wastewater to anaerobic biological treatment to reduce selenate ions and/or selenite ions present in the wastewater to simple selenium, which is insoluble, to thereby remove the selenate ions and/or the selenite ions in the form of insoluble simple selenium; adding to the biologically treated water a metallic compound that reacts with selenate ions and/or selenite ions to form an insoluble selenium compound(s) or simple selenium, to thereby remove selenate ions and/or selenite ions remaining in the biologically treated water, in the form of an insoluble substance(s); and, as needed, further filtrating the treated water.

Specifically, first, through anaerobic biological treatment, selenate ions and/or selenite ions present in selenium-containing wastewater (raw waste water) are reduced to simple selenium, which is insoluble and removed. However, as mentioned previously, in the case of wastewater which contains a relatively high concentration of selenium, or wastewater whose selenium concentration varies, biological treatment becomes unstable due to fluctuactions in selenium loadings. As a result, soluble selenium may not be removed sufficiently, and the quality of the biologically treated water may worsen.

Thus, subsequent to the above biological treatment, to the biologically treated water is added a metallic compound that reacts with selenate ions and/or selenite ions to form an insoluble selenium compound(s) or simple selenium, to thereby make selenate ions and/or selenite ions remaining in the biologically treated water into an insoluble substance(s). Subsequently, the thus-formed insoluble substance(s) is removed through solid-liquid separation such as sedimentation treatment, floatation treatment, or like treatment. This stabilizes treatment performance of an entire apparatus. Even when the quality of the biologically treated water worsens, soluble selenium which has not been removed through biological treatment can be removed. Thus, hexavalent selenate ions and/or tetravalent selenite ions can be removed from selenium-containing wastewater until the selenium content is reduced to a trace level.

In the above two-stage treatment, since a large amount of selenate ions and/or selenite ions can be removed in the upstream biological reduction treatment, a load of the downstream chemical treatment can be significantly decreased as compared to the aforementioned methods (1) and (2), in which a similar treatment is performed individually. Thus, in the downstream chemical treatment in accordance with the present invention, the usage of a metallic compound can be greatly reduced and the amount of sludge generated after solid-liquid separation can also be reduced significantly.

Further, through filtration of the treated water subsequent to the above chemical treatment, a trace of selenium-containing suspended substance that may otherwise leaks into the treated water can be removed, thereby yielding treated water whose selenium concentration is further reduced.

Accordingly, the present invention provides a method for treating selenium-containing wastewater characterized by comprising:

a first step of subjecting selenium-containing wastewater to anaerobic biological treatment so as to reduce selenate ions and/or selenite ions present in the wastewater to simple selenium, which is insoluble, to thereby remove the selenate ions and/or the selenite ions in the form of insoluble simple selenium; and a second step of adding a metallic compound to water treated in the first step so as to make selenate ions and/or selenite ions remaining in the water into an insoluble substance(s) to thereby remove the selenate ions and/or the selenite ions in the form of the insoluble substance(s).

The present invention provides a method for treating selenium-containing wastewater characterized by further comprising a third step of filtrating water treated in the second step, subsequent to the second step.

The present invention provides an apparatus for treating selenium-containing wastewater characterized by comprising: biological treatment means for subjecting selenium-containing wastewater to anaerobic biological treatment so as to reduce selenate ions and/or selenite ions present in the wastewater to simple selenium, which is insoluble, to thereby remove the selenate ions and/or the selenite ions in the form of insoluble simple selenium; and chemical treatment means for adding a metallic compound to water treated by the biological treatment means so as to make selenate ions and/or selenite ions remaining in the water into an insoluble substance(s) to thereby remove the selenate ions and/or the selenite ions in the form of the insoluble substance(s).

The present invention provides an apparatus for treating selenium-containing wastewater characterized by further comprising filtration means for filtrating water treated by the chemical treatment means.

The method and the apparatus of the present invention will next be described in detail.

[Method of the Present Invention]
First Step

In the first step of the method of the present invention, soluble selenium present in selenium-containing wastewater (raw waste water) is reduced to simple selenium, which is insoluble, through anaerobic biological treatment. Most of the resultant simple selenium precipitate is drawn out and removed, together with excess sludge. A portion of the simple selenium precipitate leaks into the treated water. In this case, in the first step, anaerobic biological treatment may be conducted under a facultative anaerobic condition, not necessarily under an anoxic condition. Specifically, a condition in which dissolved oxygen is substantially absent in water (an oxygen-free condition) may suffice. Nitrate ions, nitrite ions, and like ions containing oxygen may be present in water.

In order to reduce soluble selenium to simple selenium through anaerobic biological treatment, hydrogen donors are required. When selenium-containing wastewater (raw waste water) is deficient in hydrogen donors required (an organic substance, or the like), in the first step hydrogen donors are added to raw waste water under treatment to supply deficiency in hydrogen donors. When nitrate ions and sulfate ions are present in raw waste water, and the raw waste water is deficient in hydrogen donors necessary for reduction of soluble selenium and for reduction of nitrate and sulfate ions, it is preferable that in the first step hydrogen donors be added to raw waste water in consideration of the amount of hydrogen donors necessary for reduction of nitrate and sulfate ions so as to supply deficiency in hydrogen donors. This is because hydrogen donors are also consumed in reduction of nitrate and sulfate ions.

Examples of a hydrogen donor include alcohols such as methanol, ethanol, etc.; organic acids such as acetic acid, etc.; sugars and like organic substances; and another wastewater which contains organic substances. The amount of a hydrogen donor to be added is preferably such that the amount of a hydrogen donor in water is at least 1.3 times a stoichiometrically required amount. However, even when the amount of a hydrogen donor to be added is somewhat insufficient, and consequently soluble selenium is not sufficiently reduced through biological treatment, the present invention has an advantage that soluble selenium can be chemically removed in the second step. A hydrogen donor may be added to raw waste water before the raw waste water enters a biological treatment apparatus, or to water under treatment within the biological treatment apparatus.

Second Step

In the second step of the present invention, the water treated in the first step has is added a metallic compound that reacts with selenate ions and/or selenite ions to form an insoluble selenium compound(s) (including a sparingly-soluble selenium compound(s)) or simple selenium; i.e., a metallic compound(s) that generates ions that react with selenate ions and/or selenite ions to form an insoluble selenium compound(s) or simple selenium, whereby soluble selenium remaining in the water is made into an insoluble substance(s), which is then removed through coagulation and sedimentation, coagulation and floatation, or a like method.

Studies conducted by the inventors of the present invention have revealed the following. In the anaerobic biological treatment conducted under a facultative anaerobic condition in the first step, of soluble selenium, hexavalent selenate ions are apt to readily undergo a biologically effected reducing reaction and are thus reduced to tetravalent selenite ions or simple selenium. Thus, hexavalent selenate ions are reduced and removed with relative ease such that the wastewater regulation value is met. Accordingly, in many cases, waste water treated in the first step contains hardly any hexavalent selenate ions and contains only a small amount of tetravalent selenite ions as remaining soluble selenium which has not been reduced in the first step. Incidentally, it is conceivable that hexavalent selenate ions are once reduced to tetravalent selenite ions and then to simple selenium, whereas tetravalent selenite ions are directly reduced to simple selenium.

A metallic compound(s) used in the second step is not particularly limited. However, when waste water treated in the first step contains only tetravalent selenite ions as remaining soluble selenium, there is preferably used, as a metallic compound(s) for use in the second step, one or more metal salts selected from the group consisting of a ferric salt, a copper salt, a silver salt, a zinc salt, an aluminum salt, a magnesium salt, a calcium salt, and a barium salt. As mentioned previously, metallic compounds other than a ferrous salt have difficulty in making hexavalent selenate ions into an insoluble substance. However, when waste water treated in the first step contains hardly any hexavalent selenate ions and contains only a small amount of residual tetravalent selenite ions, use of a metallic compound(s) other than a ferrous salt is advantageous in terms of various aspects; for example, such a metallic compound(s) is easier to handle than a ferrous salt, and facilitates pH adjustment of water under treatment. The above metallic compounds to be used are those compounds that generate $Fe^{3+}$, $Cu^{2+}$, $Zn^{2+}$, $Ag^+$, $Al^{3+}$, $Mg^{2+}$, $Ca^{2+}$, and $Ba^{2+}$; for example, metal salts such as ferric chloride, copper sulfate, zinc sulfate, silver chloride, aluminum chloride, aluminum sulfate, magnesium sulfate, magnesium chloride, calcium chloride, barium chloride, etc.; calcium hydroxide; magnesium hydroxide; etc. The above metal ions react with tetravalent selenite ions to form an insoluble selenium compound. The thus-formed insoluble selenium compound(s) is removed through coagulation and sedimentation, coagulation and floatation, or a like method. The amount of the above added metallic compound(s) as a metal such as iron is preferably at least 40 times by weight that of residual selenium, particularly 50 to 80 times by weight.

However, when biological treatment in the first step becomes insufficient for the reason of, for example, variation of quality of raw waste water, variation of flow rate of raw waste water, or the like, hexavalent selenate ions may still remain in water treated in the first step. In such a case, there is preferably used, as a metallic compound(s) for use in the second step, a ferrous salt capable of making both hexavalent selenate ions and tetravalent selenite ions into insoluble substances. In this case, as mentioned previously, soluble selenium is reduced to simple selenium through reducing action of $Fe^{2+}$, and $Fe^{2+}$ reacts with soluble selenium to form an insoluble selenium compound(s), whereby soluble selenium is made into insoluble substances. The thus-formed insoluble substances are removed through coagulation and sedimentation, coagulation and floatation, or a like method. When a ferrous salt is used, flocs of ferrous hydroxide are formed in the second step. Simple selenium and microorganisms leaking out from the first step are also adsorbed on coagulated flocs of iron hydroxide generated in the second step to thereby be separated. When a ferrous salt is used in the second step, the ferrous salt may be any water-soluble ferrous salt such as ferrous sulfate, ferrous chloride, etc. The amount of a ferrous salt as iron is preferably at least 40 times by weight that of residual selenium, particularly 50 to 80 times by weight.

In the second step, preferably, a pH regulator, such as an alkali agent (e.g. sodium hydroxide), an acid agent (e.g. hydrochloric acid), or a like agent, together with a metallic compound, is added to water under treatment so as to perform the reaction while the pH of water under treatment is adjusted to a value within a range suited for the reaction. The pH of water under treatment suited for reaction depends on a metallic compound(s) to be used. For example, when a ferrous salt is used, a suitable pH value is 8.5–10; when a ferric salt is used, a suitable pH value is 4–6; and when a magnesium salt is used, a suitable pH value is 10–10.5. Also, in the second step, preferably, a coagulant aid such as a polyelectrolyte coagulant or a like agent is added for coagulation treatment.

Third Step

In the third step of the method of the present invention, a selenium-containing insoluble substance (suspended substance) that leaks into water treated in the second step is removed through filtration treatment, yielding treated water (filtered water) whose selenium concentration is further reduced. The filtration treatment is performed through use of a filter medium or a membrane (a microfiltration membrane, an ultrafiltration membrane, or a like membrane). However, the method of the filtration treatment is not limited thereto.

[Apparatus of the Present Invention]

Biological Treatment Means

The biological treatment means of the apparatus of the present invention is adapted to carry out the first step as described above. The configuration of the biological treatment means is not particularly limited. For example, there may be used, as the biological treatment means, one or more biological treatment apparatus of a similar kind or different kinds that employ a fixed bed type biological treatment method, a fluidized bed type biological treatment method, a suspension type biological treatment method, a sludge blanket type biological treatment method, or a like method, or a combination thereof.

Chemical Treatment Means

The chemical treatment means of the apparatus of the present invention is adapted to carry out the second step as described above. The configuration of the chemical treatment means is not particularly limited. For example, there may be used, as the chemical treatment means, a coagulation and sedimentation apparatus or a coagulation and floatation apparatus, in either case the apparatus being equipped with a reaction tank and a coagulation and sedimentation (or floatation) tank and a reaction tank having a mechanism for adding a metallic compound(s), a mechanism for adding a pH regulator, a mechanism for stirring water under treatment, etc.

Filtration Means

In the apparatus of the present invention, through disposition of the filtration means downstream of the chemical treatment means, there can be obtained treated water (filtered water) whose selenium concentration is further reduced. In this case, the filtration means may be equipped with, for example, a filter medium, such as sand or the like, and a membrane, such as a microfiltration membrane, an ultrafiltration membrane, or a like membrane.

BRIEF DESCRIPTION OF DRAWING

FIG. 1 is a flow chart showing an embodiment of an apparatus for treating selenium-containing wastewater according to the present invention.

BEST MODE FOR CARRYING OUT THE INVENTION

The present invention will next be described in detail with reference to the drawing.

FIG. 1 is a flow chart showing an embodiment of an apparatus for treating selenium-containing wastewater according to the present invention. The apparatus is composed of: biological treatment means 6 including a former-stage fixed bed type biological treatment apparatus 2 and a latter-stage fixed bed type biological treatment apparatus 4 which are connected to each other and filled with microorganism carriers such as gravel, burned aggregate, or plastic carriers having various shapes; a coagulation and sedimentation apparatus 12 (chemical treatment means) including a reaction tank 8 and a coagulation and sedimentation tank 10; and a filtration apparatus 14 (filtration means) such as a sand filter or the like.

In the biological treatment means 6, the former-stage biological treatment apparatus 2 and the latter-stage biological treatment apparatus 4 are adopted to reduce soluble selenium present in selenium-containing wastewater (raw waste water) 16 to insoluble simple selenium, which is removed. In the present embodiment, the biological treatment apparatus is of two stages, but may be of a single stage.

In the chemical treatment means 12, for example, a metal salt such as *ferrous chloride, ferric chloride, or the like and a pH regulator such as sodium hydroxide or the like are added in the reaction tank 8, which contains treated water received from the biological treatment means 6. While the pH of water under treatment is held within a range suited for reaction, the water under treatment is stirred for about 10–60 minutes to generate an insoluble selenium compound(s) or simple selenium or fine flocs of these insoluble selenium substances and metal hydroxides. Next, the resulting reaction solution is introduced into the coagulation and sedimentation tank 10. A polyelectrolyte coagulant is added to the reaction solution contained in the coagulation and sedimentation tank 10 so as to agglomarate fine flocs of insoluble selenium compounds and metal hydroxides in the reaction solution into coarse flocs, thereby effecting separation through sedimentation. Through use of such chemical means, soluble selenium remaining in treated water released from the biological treatment means 6 is made into an insoluble substance(s) and removed in the form of sediment. Also, supernatant water whose selenium concentration is reduced can be obtained.

The filtration apparatus 14 (filtration means) is adapted to treated water (supernatant water) coming from the coagulation and sedimentation tank 10 so as to remove a trace of selenium-containing insoluble substance remaining in the water. Thus, there can be obtained treated water whose selenium concentration is further reduced.

EXPERIMENT EXAMPLES

The experiments as described below were conducted to confirm the effect of the present invention.

Experiment Example 1

The components listed below were dissolved in city water so as to have corresponding concentrations given below, yielding artificial selenium-containing wastewater serving as raw waste water. The thus-obtained artificial raw waste water was subjected to the treatments of the following first through third steps. Notably, methanol served as a hydrogen donor, and ammonium chloride and potassium dihydrogenphosphate served as a nutrition source for microorganisms.

Composition of Raw Waste Water

| | |
|---|---|
| Sodium selenate (hexavalent selenium) | 10 mg Se/L |
| Sodium selenite (tetravalent selenium) | 3 mg Se/L |
| Ammonium chloride | 1 mg N/L |
| Potassium dihydrogenphosphate | 0.2 mg P/L |
| Methanol | 75 mg CH$_3$OH/L |

First Step

The raw waste water was subjected to anaerobic biological treatment conducted under a facultative anaerobic condition through use of a fixed bed type biological treatment apparatus. The biological treatment apparatus used was a cylindrical column having a volume of about 1.8 liters and filled with porous burned aggregate (ACTILIGHT manufactured by Organo Corp.) such that the aggregate has an apparent volume of 1.5 liters. The raw waste water was continuously introduced into the biological treatment apparatus such that the residence time of water under treatment became about 5 hours.

Second Step

Water treated in the first step was introduced into a reaction tank. Ferric chloride was added to the water contained in the reaction tank such that the amount of ferric chloride as iron was 50 times by weight that of selenium remaining in the water treated in the first step. While the pH of water under treatment was being regulated within a range of 5.5±0.5, the water under treatment was stirred for 30 minutes. As a result, coagulated flocs were formed. The coagulated flocs were allowed to stand for sedimentation, yielding supernatant water.

Third Step

The supernatant water obtained in the second step was filtrated through use of No. 5c filter paper, yielding filtered water as final treated water.

Result

The intermediate treated water obtained after completion of the first step, the supernatant water obtained in the second step, and the final treated water obtained after completion of the third step were measured for the concentration of hexavalent selenate ions (SeO$_4^{2-}$) and the concentration of tetravalent selenite ions (SeO$_3^{2-}$) or total selenium concentration. The measurement revealed that in the intermediate treated water obtained after completion of the first step, the concentration of hexavalent selenate ions was not greater than 0.02 mg Se/L (not greater than a detection limit), but tetravalent selenite ions remained at a concentration of about 1 mg Se/L. By contrast, in the supernatant water obtained in the second step, the total selenium concentration was reduced to 0.05 mg Se/L or lower. Further, in the final treated water obtained after completion of the third step, the concentration of selenate ions and the concentration of selenite ions were reduced to 0.02 mg Se/L or lower, respectively, and the total selenium amount was not greater than 0.1 mg Se/L.

Experiment Example 2

Artificial selenium-containing wastewater used as raw waste water was similar to that used in Experiment Example 1 except that the methanol concentration was 50 mg CH$_3$OH/L. The raw waste water was subjected to the treatments of the following first through third steps.

First Step

The raw waste water was subjected to anaerobic biological treatment in a manner similar to that of Experiment Example 1. However, the residence time of water under treatment was about 4 hours in the biological treatment apparatus.

Second Step

Water treated in the first step was introduced into the reaction tank. Ferric chloride was added to the water contained in the reaction tank such that the amount ferric chloride as iron was 50 times by weight that of selenium remaining in the water treated in the first step. While the pH of water under treatment was being regulated within a range of 9.0±0.5, the water under treatment was stirred for 30 minutes. As a result, coagulated flocs were formed. The coagulated flocs were allowed to stand for sedimentation, yielding supernatant water.

Third Step

The supernatant water obtained in the second step was filtrated through use of No. 5c filter paper, yielding filtered water as final treated water.

Result

Measurements were conducted in a manner similar to that of Experiment Example 1. The measurements revealed that in the intermediate treated water obtained after completion of the first step, at least 95% of hexavalent selenate ions were removed, but about 0.4 mg Se/L of hexavalent selenate ions remained. Tetravalent selenite ions generated through reduction of selenate ions and selenite ions originally contained in the raw waste water remained at a concentration of about 5 mg Se/L due to incomplete reduction. By contrast, in the supernatant water obtained in the second step, the total selenium concentration was reduced to about 0.07 mg Se/L. Further, in the final treated water obtained after completion of the third step, the concentration of selenate ions and the concentration of selenite ions were reduced to 0.02 mg Se/L or lower, respectively, and the total selenium amount was not greater than 0.1 mg Se/L.

INDUSTRIAL APPLICABILITY

As described above, according to the present invention, hexavalent selenate ions or tetravalent selenite ions or both can be removed from selenium-containing wastewater to a great extent to thereby clear a wastewater regulation limit of not greater than 0.1 mg Se/L. Also, since the amount of added chemicals and the amount of generated sludge can be reduced in the chemical treatment step (second step), running cost and waste treatment cost can be cut down. Accordingly, the method and the apparatus of the present invention are favorably used for treating selenium-containing wastewater such as metal refinery wastewater, mine wastewater, thermal power plant wastewater, glass plant wastewater, etc.

We claim:

1. A method for treating selenium-containing wastewater characterized by comprising:

a first step of subjecting selenium-containing wastewater to anaerobic biological treatment so as to reduce selenate ions and/or selenite ions present in the wastewater to simple selenium, which is insoluble, to thereby remove the selenate ions and/or the selenite ions in the form of insoluble simple selenium; and a second step of adding a metallic compound(s) to water treated in the first step so as to make selenate ions and/or selenite ions remaining in the water into an insoluble substance(s) to thereby remove the selenate ions and/or the selenite ions in the form of insoluble substances.

2. A method for treating selenium-containing wastewater according to claim 1, wherein in the second step, a ferric salt, a copper salt, a silver salt, a zinc salt, an aluminum salt, a magnesium salt, a calcium salt, and a barium salt are selectively used singly or in combination as the metallic compound.

3. A method for treating selenium-containing wastewater according to claim 2, wherein the amount of the added metallic compound as a metal is 50 to 80 times by weight that of selenium remaining in the water treated in the first step.

4. A method for treating selenium-containing wastewater according to claim 1, wherein in the second step, a ferrous salt is used as the metallic compound.

5. A method for treating selenium-containing wastewater according to claim 4, wherein the amount of the added ferrous salt as iron is 50 to 80 times by weight that of selenium remaining in the water treated in the first step.

6. A method for treating selenium-containing wastewater according to claim 1, further comprising a third step of filtrating water treated in the second step, subsequent to the second step.

7. An apparatus for treating selenium-containing wastewater characterized by comprising:

biological treatment means for subjecting selenium-containing wastewater to anaerobic biological treatment so as to reduce selenate ions and/or selenite ions present in the wastewater to simple selenium, which is insoluble, to thereby remove the selenate ions and/or the selenite ions in the form of insoluble simple selenium; and chemical treatment means for adding a metallic compound to water treated by the biological treatment means so as to make selenate ions and/or selenite ions remaining in the water into an insoluble substance to thereby remove the selenate ions and/or the selenite ions in the form of the insoluble substance.

8. An apparatus for treating selenium-containing wastewater according to claim 7, further comprising filtration means for filtrating water treated by the chemical treatment means.

9. An apparatus for treating selenium-containing wastewater according to claim 7, wherein the chemical treatment means comprises a mechanism for adding a pH regulator to water under treatment.

* * * * *